Aug. 10, 1926.
O. C. R. WOLLER
1,595,419
COMBINED LAMP AND LICENSE PLATE SUPPORT
Filed Feb. 15, 1926     2 Sheets-Sheet 1
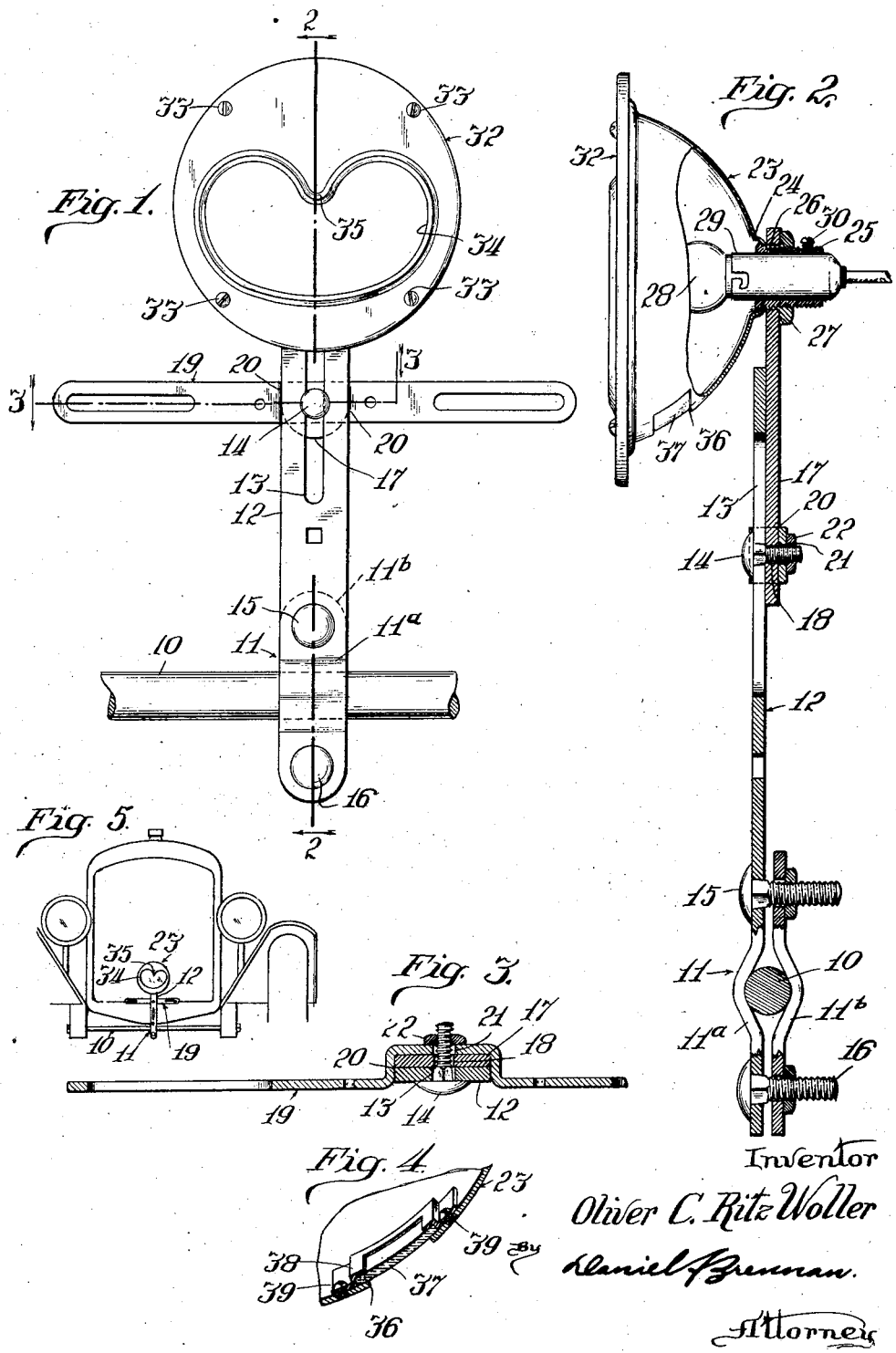
Inventor
Oliver C. Ritz Woller
Daniel Brennan
Attorney

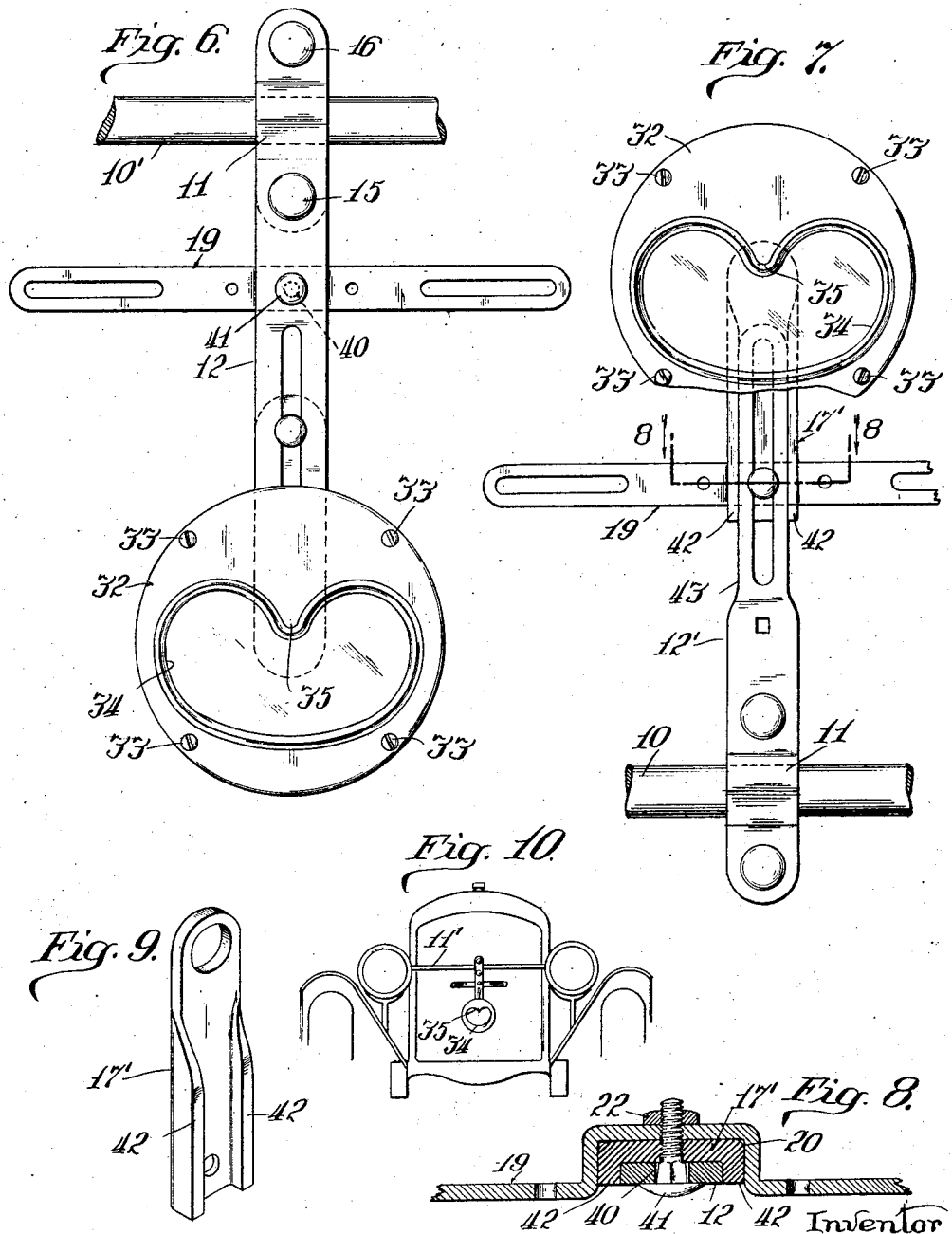

Patented Aug. 10, 1926.

1,595,419

UNITED STATES PATENT OFFICE.

OLIVER C. RITZ WOLLER, OF CHICAGO, ILLINOIS.

COMBINED LAMP AND LICENSE-PLATE SUPPORT.

Application filed February 15, 1926. Serial No. 88,332.

This invention relates to automobile lamps and more particularly to a combination lamp and license plate support.

It contemplates more especially the provision of an auxiliary light which projects a fan shaped ray below the line of vision of approaching drivers, thereby avoiding the obnoxious glare incident with headlights of the usual construction.

The devices of known construction which have been employed for like purposes are not universally adapted for use with all types of vehicles, in that the effectiveness and desirability of such lamps depends largely upon their position with reference to the ground, thereby necessitating a special bracket for each type of automobile. This of course is objectionable, since it increases their cost of production, and also requires the dealer to carry an ample supply of each type or size to meet the demands of the trade.

One object of the present invention is to simplify and improve the construction of devices of the character mentioned.

Another object is to provide a license bracket and illuminator therefor, which is adjustable to any position, thereby adapting its use with any type of vehicle.

A further object is to provide an automobile illuminating fixture which can be readily secured in any desirable position to vehicles of standard construction.

A still further object is to provide an automobile lamp and license bracket therefor, which is inexpensive, adjustable, and durable.

Other objects and advantages will appear from the following description of an illustrated embodiment of the present invention.

In the drawings:

Figure 1 is a front elevation of a lamp support embodying features of the present invention.

Figure 2 is a sectional view taken substantially along line 2—2 of Figure 1.

Figure 3 is a sectional view taken substantially along line 3—3 of Figure 1.

Figure 4 is a fragmentary view taken substantially along line 4—4 of Figure 2.

Figure 5 is a front view of an automobile showing the manner in which the lamp support and license carrier shown in Figure 1 is attached.

Figure 6 is a view similar to Figure 1 showing the lamp in an inverted position.

Figure 7 is a view similar to Figure 1 showing a modified form of the invention.

Figure 8 is a sectional view taken substantially along line 8—8 of Figure 7.

Figure 9 is a perspective view of the lamp support shown in Figure 7.

Figure 10 is a view similar to Figure 5 showing the manner of attaching the inverted lamp and plate carrier to a vehicle having a transverse bar further removed from the ground than the one shown in Figure 5.

The fixture illustrated in Figures 1 to 5 inclusive is shown attached to an automobile of standard construction which usually is provided with one or more transverse bars 10 utilized for re-inforcing the headlights or frame structure or both. To enable the use of the transverse bar 10 as a mounting means for a lamp bracket, a clamp 11 having companion clamping bars 11$^a$ and 11$^b$ is provided at one end thereof. In the present showing, the clamping bar 11$^a$ has an elongated substantially flat extension 12 which is longitudinally slotted as at 13 to receive a carriage bolt 14 mounted for sliding movement therein. As shown the extension 12 is secured to the transverse bar 10 of an automobile by virtue of the clamp fasteners 15 and 16 which extend through the extremities of the companion clamping bars 11$^a$ and 11$^b$ thereby conveniently anchoring the extension 12 to the transverse bar 10.

That fact that the transverse bar 10 is not uniformly spaced from the ground in all types of vehicles, necessitates the use of an adjustable lamp support which permits vertical adjustment of the lamp carried thereby in order to arrange the latter in a position most effective for illuminating the vehicle's path of travel. To accomplish this end, a lamp support 17 having an aperture 18 at its lower extremity to receive the shank of the fastening bolt 14, is employed to facilitate relative movement between the supporting bar 17 and the bracket extension 12. A license plate carrier 19 comprising a substantially flat bar is bent at its mid-portion to provide a depression 20 to receive the relatively adjustable, telescoping supporting members 12 and 17. The carrier 19 in this instance is provided with a centrally disposed hole 21, which in its normal position, alines with the aperture 18 of the lamp supporting bar 17 which is associated therewith in a transverse fixed relation by virtue of the stud 14 which holds the three members 12, 17 and 19 together by means of a nut 22 which is in threaded engagement with the shank of the stud 14. It will be noted that the bar 17 with its license carrier 19 of standard construction is relatively movable with respect to the bracket extension 12 in a vertical direction so that the lamp casing 23 to be hereinafter described may be positioned at any distance, within the range of the slot 13, from the transverse bar 10 which is secured to the vehicle. It will be noted that the bars 12 and 17 are always retained in alignment by virtue of the depression 20 in the carrier 19 so that relative rotative movement between the parts is impossible. This is desirable in that there is no possibility of the lamp turning, thereby avoiding breakage and insuring rigidity at all times.

As shown the lamp casing 23 is of parabolic shape and terminates at its center in a peripheral flange 24 which is secured in any appropriate manner to a suitable bushing 25 adapted to project through the hole 26 provided in the upper extremity of the bar 17. The bushing 25 is externally threaded to receive the nut 27 which rigidly secures the lamp casing 23 to the support 17. The lamp 28 secured in an appropriate socket 29 in the usual manner, occupies the central portion of the lamp casing 23, thereby providing a source of light in the focus of the paraboloid shaped interior of the lamp casing. The socket 29 is secured within the bushing 25 by means of a suitable set screw 30 which projects through an appropriate threaded radial aperture provided in the wall of the housing 25 so that the lamp 28 with its socket 29 may be adjusted within the casing 23 to effectively diffuse the light rays eminating from the lamp 28. The lamp casing 23 is provided with a face plate 32 secured to its open face by any appropriate fasteners 33. A cutout portion 34 in the cover plate 32 of the lamp casing 23 is preferably of kidney shape with its lobes extending upward, thereby providing an apex 35 centrally disposed with reference to the lobes. A lens having suitable light diffusing characteristics is secured to the inner face of the plate 32 in the usual manner. It is to be noted that the apex 35 is in the approximate vicinity of the optical axis of the lamp casing 23 to facilitate the diffusion of the light rays to the side of the road, thereby creating a lighted area in the vehicle's path of travel which is not detrimental to pedestrians and vehicle passengers traveling in the opposite direction. Obviously the casing 23 must be a suitable distance from the ground in order to provide a light area of effective magnitude without creating an obnoxious glare. The adjustable feature above described is, therefore, highly desirable in bringing about an adjustment to enable the use of a standard lamp support for all vehicles.

The license plate carried by the bracket 19 is preferably illuminated as required by law, and to accomplish this end, the source of light within the casing 23 is also used to provide the necessary license plate illumination. Accordingly, a portion of the lamp casing 23 is, in this instance, cut away to provide an opening 36 in proximity to the license carrier so that the light rays emanating from the lamp 28 and the rays reflected from the interior walls of the casing 23 will emerge from the opening 36, and are directed in close proximity to the license plate secured to the carrier 19. To prevent dirt and other foreign matter from entering the casing 23 through this opening, a lens 37 of any suitable transparent material such as glass and the like, is provided to cover the opening 36. In the present showing, a frame 38 of any appropriate construction is secured to the interior of the lamp casing around the opening 36 by any appropriate fasteners 39 to retain the lens 37 in position without the possibilty of its rattling or otherwise becoming loose. It will be noted that prismatic projections may be provided on the lens 37 to refract the light rays in a more concentrated mass upon the license carrier. In some vehicles a transverse bar 10' is employed to support their headlights as shown in Figure 10. Obviously such a construction cannot be used to support the fixture in the manner shown in Figure 1, since the lamp casing 23 would be entirely too far removed from the ground. To overcome this difficulty the lamp casing may be mounted in an inverted position on the rod 10' (Figure 10) which only necessitates the turning the lamp casing one hundred and eighty degrees from its normal position in order to retain the lobe 35 of the cutout portion in its normal position effective to diffuse the light rays sidewardly and downwardly. With this arrangement the carrier 19 (Figure 6) is preferably fixed to the extension 12 which is provided with an appropriate aperture 40 designed to receive the carriage bolt 41, thereby rigidly securing the carrier to the bar 12.

The fixture shown in Figures 7 to 9 inclusive, is similar to the fixture above described, except that the lamp support 17', in this instance, is provided with upstanding edge flanges 42 designed to receive the reduced portion 43 of the longitudinally slotted extension 12'. This feature renders the fixture more rigid, in that the guided extension 12' cooperating with the flanged bar 17' are positively held from relative rotative movement.

Various changes may be made in either embodiment of the invention herein specifically described without departing from or sacrificing any of the advantages of the invention as defined in the appendent claims.

I claim:

1. In a device of the character described, the combination with a source of light adapted to form a sidewardly and downwardly projected area of light, of supporting means therefor, said means comprising longitudinally related telescoping members, one of said members having a longitudinal slot and the other of said members having an aperture for registry therewith, fastening means extending thru the slot and aperture to maintain the members in any desired spaced relation, and companion clamping means on the free end of said support to anchor said support to a rigid structure.

2. In a device of the character described, a source of light adapted to form a sidewardly and downwardly projected area of light, license plate supporting means therefor, said means comprising two relatively movable members adapted to slide upon each other, and a bar positioned transversely of and intermediate the ends of said members, guiding means for said members comprising a depression in said transverse bar adapted to receive and guide said members, securing means for said transverse bar and said members and means to anchor said supporting means to a structure.

3. In a device of the character described, a source of light, license plate supporting means therefor, said means comprising two relatively movable members adapted to slide upon each other, and a bar positioned transversely of said members, guiding means associated with said members comprising a depression in said transverse bar adapted to receive and guide said members, securing means extending thru said bar and movable members to secure said parts in fixed relation, and means on said supporting means to anchor said supporting means to a structure.

4. In a device of the character described, the combination of vertically extensible members, a license plate carrier comprising a bar disposed transversely to said extensible members, and having a depression in which said members are received, fastening means extending thru said bar and members whereby said parts are maintained in fixed relation, a lamp casing attached to the extremity of one of said members, and securing means attached to the extremity of the other member.

5. In a device of the character described, in combination, a license plate carrier, a lamp casing, a source of light within said casing, vertically extensible members providing a support for said lamp casing and operatively joined to said license plate carrier, anchoring means to anchor said carrier to said extensible members, and means to permit relative adjustment between said license plate carrier and the relatively lower of said extensible members.

6. In a device of the character described, a lamp casing, a source of light within said casing, extensible members providing a support for said casing, one of said members having a vertical slot in registry with an aperture in said other member, a license plate carrier operatively joined to said extensible members, a detachable fastener extending thru said members and carrier for securing the parts together, thereby enabling the lamp casing and carrier to be adjusted and locked in different positions, and means to support the extensible members in position comprising a depression in said license plate carrier in which said extensible members are received.

7. In a device of the character described, in combination, a source of light, a license plate carrier, and supporting members for said light and carrier having a connection therewith, said supporting members being adjustable to different positions, said carrier comprising a flat bar having at its substantial midsection a bent depression extending rearwardly about said members and in which depression said members are received, whereby turning between said arms and carrier is prevented.

In testimony whereof I affix my signature at 10 S. LaSalle St., Otis Bldg., Chicago, Ill.

OLIVER C. RITZ WOLLER.